(12) United States Patent
Small et al.

(10) Patent No.: US 8,832,815 B2
(45) Date of Patent: Sep. 9, 2014

(54) ACCESSORY BASED DATA DISTRIBUTION

(75) Inventors: Andrea Small, Seattle, WA (US); Joyce S. Chou, Seattle, WA (US); Anthony Giardini, Seattle, WA (US); Jae Y. Lee, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 768 days.

(21) Appl. No.: 12/764,376

(22) Filed: Apr. 21, 2010

(65) Prior Publication Data

US 2011/0058516 A1 Mar. 10, 2011

Related U.S. Application Data

(60) Provisional application No. 61/240,847, filed on Sep. 9, 2009.

(51) Int. Cl.
| | |
|---|---|
| *G06F 15/16* | (2006.01) |
| *H04L 29/08* | (2006.01) |
| *H04M 1/725* | (2006.01) |
| *H04W 92/08* | (2009.01) |

(52) U.S. Cl.
CPC ........ *H04M 1/72525* (2013.01); *H04M 1/7253* (2013.01); *H04L 67/02* (2013.01); *H04W 92/08* (2013.01); *H04L 67/04* (2013.01)
USPC .............. 726/9; 370/328; 455/412; 709/229

(58) Field of Classification Search
USPC .............. 726/9; 370/328; 455/412; 709/228
See application file for complete search history.

(56) References Cited

U.S. PATENT DOCUMENTS

| | | | |
|---|---|---|---|
| 6,016,038 A | 1/2000 | Mueller et al. | |
| 6,122,631 A * | 9/2000 | Berbec et al. | ............ 1/1 |
| 6,720,863 B2 | 4/2004 | Hull et al. | |
| 6,721,545 B2 | 4/2004 | Doi | |
| 6,771,981 B1 | 8/2004 | Zalewski et al. | |
| 6,944,482 B2 | 9/2005 | Engstrom et al. | |
| 6,954,658 B2 | 10/2005 | Engstrom et al. | |
| 6,981,791 B2 | 1/2006 | Higashiyama | |
| 7,072,621 B1 | 7/2006 | Engstrom et al. | |
| 7,096,046 B2 | 8/2006 | Shapiro et al. | |

(Continued)

FOREIGN PATENT DOCUMENTS

| | | |
|---|---|---|
| KR | 100668117 B1 | 1/2007 |
| KR | 20090034248 A | 4/2009 |
| KR | 20090108359 A | 10/2009 |

OTHER PUBLICATIONS

Halfbakery: LED Messaging Service, "Yet Another Way to Communicate via Cell Phone", retrieved Mar. 17, 2010 at <<http://www.halfbakery.com/idea/LED_20Messaging_20Service>>, 2 pgs.

(Continued)

*Primary Examiner* — Amare F Tabor
(74) *Attorney, Agent, or Firm* — Lee & Hayes, PLLC (57) ABSTRACT

In some aspects, a telecommunications device obtains an identifier from an accessory token. The telecommunications device may transmit the identifier to a server to request content associated with the identifier. The telecommunications device may receive the content from the server when the identifier is valid and/or the content is available. In various aspects, the accessory token is communicatively coupled to the telecommunications device, which enables the telecommunications device to obtain the identifier.

20 Claims, 9 Drawing Sheets

(56) References Cited

U.S. PATENT DOCUMENTS

| | | | |
|---|---|---|---|
| 7,133,707 B1 | 11/2006 | Rak et al. | |
| 7,156,311 B2 | 1/2007 | Attia et al. | |
| 7,212,839 B2 | 5/2007 | Engstrom et al. | |
| 7,287,696 B2 | 10/2007 | Attia et al. | |
| 7,571,328 B2* | 8/2009 | Baumert et al. | 713/192 |
| 7,612,997 B1 | 11/2009 | Diebel et al. | |
| 7,907,935 B2* | 3/2011 | Le Saint et al. | 455/411 |
| 8,042,163 B1* | 10/2011 | Karr et al. | 726/9 |
| 8,082,353 B2* | 12/2011 | Huber et al. | 709/229 |
| 8,094,551 B2* | 1/2012 | Huber et al. | 370/229 |
| 8,179,847 B2* | 5/2012 | Huber et al. | 370/329 |
| 8,209,745 B2* | 6/2012 | Huber et al. | 726/6 |
| 8,370,180 B2* | 2/2013 | Scott et al. | 705/5 |
| 8,495,381 B2* | 7/2013 | Priebatsch | 713/185 |
| 2002/0147035 A1 | 10/2002 | Su | |
| 2003/0210780 A1 | 11/2003 | Pratt et al. | |
| 2004/0186768 A1 | 9/2004 | Wakim et al. | |
| 2005/0163940 A1 | 7/2005 | Liang et al. | |
| 2006/0052063 A1 | 3/2006 | Lohr | |
| 2006/0116184 A1 | 6/2006 | Hayashi | |
| 2007/0186099 A1* | 8/2007 | Beck et al. | 713/159 |
| 2007/0243911 A1 | 10/2007 | Saito | |
| 2008/0127320 A1* | 5/2008 | De Lutiis et al. | 726/9 |
| 2008/0189543 A1* | 8/2008 | Parkinson | 713/156 |
| 2008/0204268 A1 | 8/2008 | Dowling et al. | |
| 2008/0244721 A1* | 10/2008 | Barrus et al. | 726/9 |
| 2009/0288140 A1* | 11/2009 | Huber et al. | 726/2 |
| 2009/0288145 A1* | 11/2009 | Huber et al. | 726/3 |
| 2010/0123666 A1 | 5/2010 | Wickholm et al. | |
| 2010/0138916 A1* | 6/2010 | Price et al. | 726/20 |
| 2010/0251352 A1* | 9/2010 | Zarchy et al. | 726/9 |
| 2010/0321275 A1 | 12/2010 | Hinckley et al. | |
| 2010/0331054 A1 | 12/2010 | Roberts et al. | |

OTHER PUBLICATIONS

The PCT Search Report and Written Opinion mailed Jun. 29, 2011 for PCT Application No. PCT/US10/56159.

"The New LG dLite", retrieved Sep. 2, 2010 from <<http://www.dlitebylg.com/pdf/dLite_specs.pdf>>, 3 pgs.

Non-Final Office Action for U.S. Appl. No. 12/764,477, mailed on Feb. 11 2013, Andrea Small et al., "Interactive Electronic Device Shell", 9 pages.

Non-Final Office Action for U.S. Appl. No. 12/764,574, mailed on Mar. 14, 2013, Andrea Small et al., "Element Mapping to Control Illumination of a Device Shell", 14 pages.

Office Action for U.S. Appl. No. 12/764,574, mailed on Aug. 29, 2013, Small et al., "Element Mapping to Control Illumination of a Device Shell", 13 pages.

Office Action for U.S. Appl. No. 12/764,477, mailed on Aug. 9, 2013, Small et al., "Interactive Electronic Device Shell", 10 pages.

Office Action for U.S. Appl. No. 12/764,574, mailed on Jan. 10, 2014, Andrea Small, "Element Mapping to Control Illumination of a Device Shell", 12 pages.

Office Action for U.S. Appl. No. 12/764,477, mailed on Mar. 28, 2014, Andrea Small, "Interactive Electronic Device Shell", 12 pages.

* cited by examiner

ACCESSORY BASED DATA DISTRIBUTION

CROSS REFERENCE TO RELATED PATENT APPLICATIONS

This patent application claims priority to U.S. Provisional Patent Application No. 61/240,847, entitled "Accessory Based Data Distribution", filed Sep. 9, 2010, which application is incorporated herein in its entirety by reference.

This patent application is also related to co-pending, commonly-owned U.S. patent application Ser. No. 12/764,574, entitled "Element Mapping to Control Illumination of a Device Shell" and U.S. patent application Ser. No. 12/764,477, entitled "Interactive Electronic Device Shell", both filed concurrently herewith, which applications are hereby incorporated in their entirety by reference.

BACKGROUND

Over the past thirty years, telephony has significantly evolved from the once-ubiquitous public switched telephone network (PSTN) service. Telecommunications consumers today have a wide range of telecommunications options to choose from, including traditional landline phone service, IP-based telecommunications services (based on, for example, Voice over Internet Protocol), cellular telecommunications services, and converged telecommunications services (such as Unlicensed Mobile Access or UMA).

Telecommunications devices now include a myriad of form factors, such as traditional landline phones, cordless phones, cellular phones, smart phones, PDA phones, desktop and portable computers, media players, home telecommunications hubs, or the like, which have become a ubiquitous part of modern life. Originally, most of these telecommunications devices just provided two-way voice communication between a first person at a first location using a first telecommunications device and a second person at a second location using a second telecommunications device, so that the first person and the second person were able to carry on a conversation. For example, a voice communication or call normally involved real-time, duplex, synchronous voice communications, in which all participants hear the other participants in real time, all participants can simultaneously speak, and all participants are actively engaged and respond directly and immediately to each other without significant interruption.

More recently, telecommunications devices have become so sophisticated as to be considered computing devices. Advances in technology have added an ever increasing array of features and capabilities to telecommunications devices, such as touch screens, video and still cameras, web browsing capabilities, email sending and receiving capabilities, music and video download, storing and playback capabilities, calendar and contact managing capabilities, GPS (global positioning system) location and navigation capabilities, game playing capabilities, and television capabilities, to name a few. Many of these features and capabilities are provided through specialized applications resident on the telecommunications devices. For example, many telecommunications devices allow the user to further customize the device through custom configuration options or by adding third-party software. Such software is available for many different functions, not limited to communications. For instance, a variety of applications, such as dedicated computer programs or software, applets, or the like, can be loaded on a telecommunications device by the consumer, the network service provider, or by the telecommunications device manufacturer. These applications can then be activated on the telecommunications device as needed or desired by the user, or as particular functions of the telecommunications device are accessed. These applications can then be activated on the telecommunications device as needed or desired by the user, or as particular functions of the telecommunications device are accessed.

Further, many network service providers or telecommunications device manufacturers now provide portals or websites from which users may purchase various applications, content and/or data files (i.e., an "app store") to add various capabilities, features and media to their telecommunications devices. These network service providers or manufacturers also enable third parties to create third party applications that can be downloaded and used on the telecommunications devices. For example, an app store might make available for download a large number of applications written by third parties, in addition to applications provided by the network service provider or by the telecommunications device manufacturer. The third party applications and service provider/manufacturer applications might typically be marketed for a specified download fee, and may be purchased from the app store through the Internet or over the network service provider's own network. By picking and choosing which applications to download to a particular telecommunications device, the telecommunications device owner can decide which corresponding capabilities the particular telecommunications device will be endowed with. Further, word-of-mouth or viral marketing can contribute greatly to the sales success of particular applications. For example, a particular user might show an application on her telecommunications device to her friends, who will then purchase the application for use on their own telecommunications devices. In some cases, the application might be transferred to the telecommunications devices for a free trial and the users are then given an option to purchase the application.

A limitation of such application, content and data distribution systems, however, is that they require a telecommunications device user to visit an electronic storefront, negotiate the presented interface, and then negotiate a purchase path in order to receive the data. In addition, if a telecommunications device user wants to share data (for instance, a collection of digital photographs) with a friend, she must negotiate a series of user interfaces allowing her to upload the data to a repository where her friend may access the data, or transmit (e.g., e-mail) the content directly to the friend.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Overview

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Figure 1A:
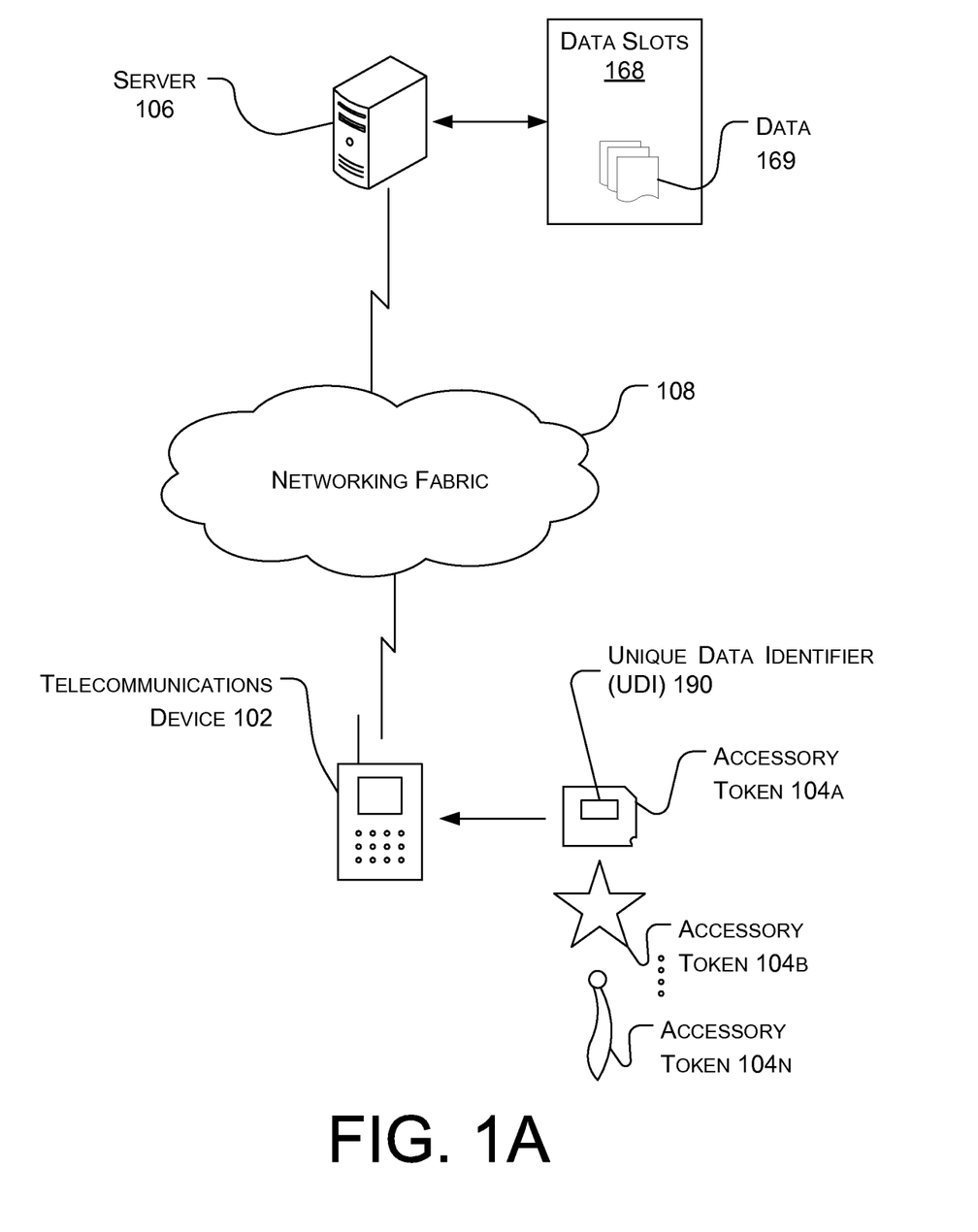
FIG. 1A is a schematic diagram of a telecommunications device in communication with a content server and an accessory token device in accordance with various embodiments.

FIG. 1A shows a telecommunications device 102 communicative with a data server 106 via a networking fabric 108, and communicative with one or more accessory tokens 104a, 104b...104n. The telecommunications device 102 may associate (communicate, inspect, etc.) with one or more accessory token(s) 104 to receive at least a unique data identifier (UDI) 190 from each accessory token. The telecommunications device 102 may communicate the UDI 190 to data server 106. In response, data server 106 matches UDI 190 to corresponding data 169 and provides such data to telecommunications device 102 via networking fabric 108. In an implementation, data server 106 matches the UDI 190 to an available data slot 168, which a user may then populate with data 169 via a data upload.

Telecommunications device 102 may be any type of electronic device capable of wired or wireless telecommunications, including but not limited to cellular phones, landline phones, IP-based phones, smart phones, desktop computers, notebook computers, netbooks, media players, digital video players/recorders, reading devices, etc. Telecommunications device 102 (as illustrated, a cellular telephone) is capable of data communication with data server 106 as well as with accessory tokens 104.

Figure 1B:
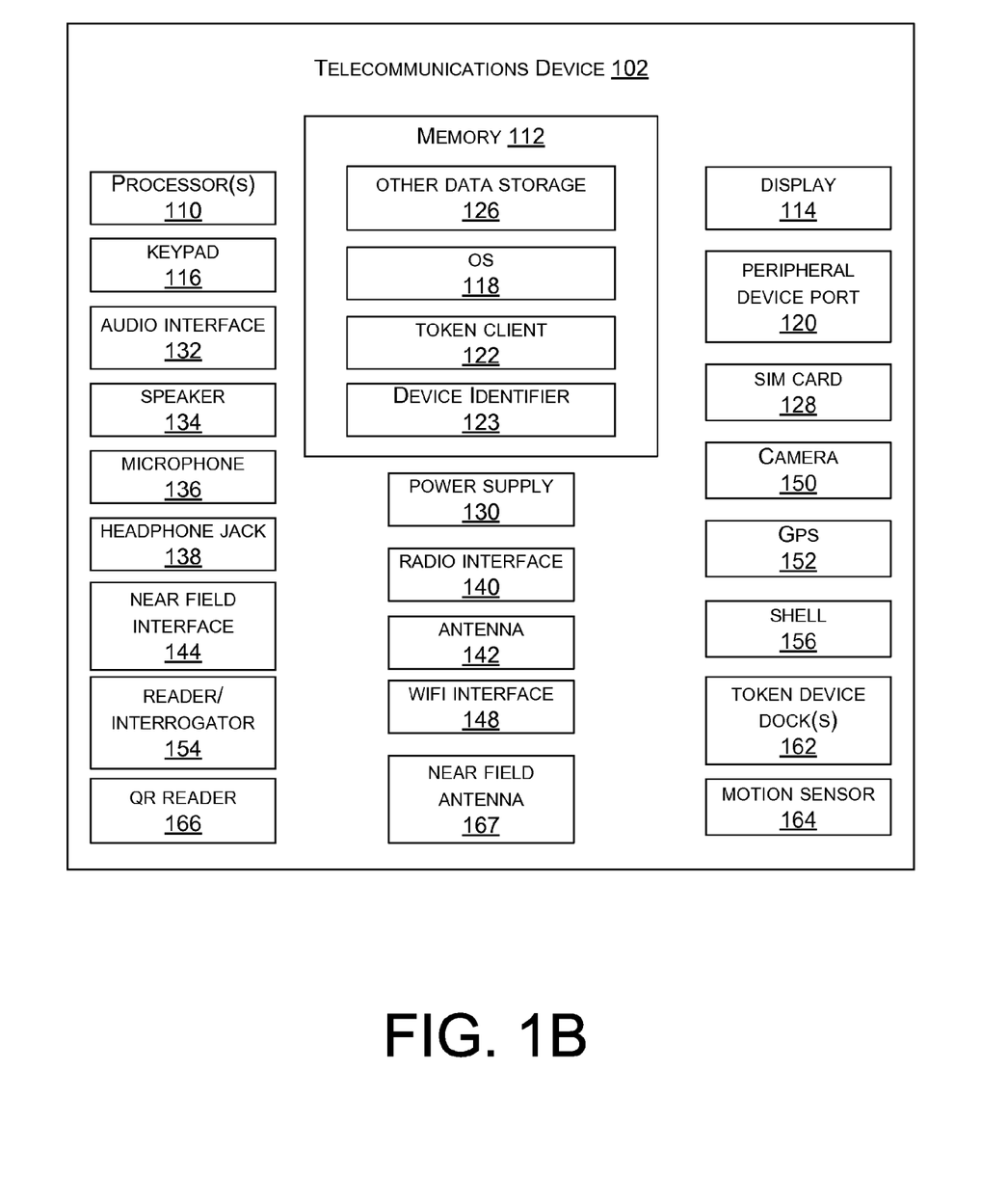
FIG. 1B is a block diagram showing components of a telecommunications device that may be used to implement the method and system described herein.

As shown in FIG. 1B, telecommunications device 102 has one or more processors 110, memory 112, a display 114, and may have a keypad 116. Memory 112 may include volatile memory and/or non-volatile memory (e.g., RAM, ROM, Flash Memory, miniature hard drive, memory card, or the like). Telecommunications device 102 includes an operating system (OS) 118, which is resident in memory 112 and executable by processor 110. Keypad 116 may be a numeric dialing pad (such as on a typical telecommunications device), a multi-key keyboard (such as a conventional QWERTY keyboard), or one or more other types of keypads, Keypad 116 may be implemented with physical buttons and/or via a touch screen (virtual keypad). Keypad 116 may also include a joy-stick-like controller and/or designated navigation buttons, or the like. Display 114 may be a liquid crystal display, or any other type of display commonly used in telecommunications devices. For example, display 114 may be a touch-sensitive touch screen, and can then also act as an input device or keypad, such as for providing a soft-key keyboard, navigation buttons, or the like. A peripheral device port or slot 120 may be included and may be of the type to accept additional memory cards, game cards, modem cards, or other types of peripheral devices, including accessory token 104. In some implementations, telecommunications device 102 may be configured with one or more device ports specific to accessory tokens 104, thereby enabling physical connectivity and communication between telecommunications device 102 and accessory tokens 104, as well as securing accessory tokens 104 to telecommunications device 102.

Telecommunications device 102 also includes other data storage 126 within memory 112. Other data storage 126 may be used to store information that is retained when the telecommunications device 102 is powered down. For example, applications may use and store persistent information in the other data storage 126. Additionally, in some implementations, telecommunications device 102 may include a subscriber identity module (SIM) card 128, which is a removable memory card used to identify a user of the telecommunications device 102 to the network service provider.

Telecommunications device 102 also includes a power supply 130, which may be implemented as one or more batteries. The power supply 130 might further include an external power source, such as an AC adapter or a powered docking cradle for supplementing or recharging the batteries.

Telecommunications device 102 may also include an audio interface 132 that is coupled to a built-in speaker 134 and microphone 136. The audio interface 132 may be used to provide audible messages to and receive audible messages from the user of telecommunications device 102. For example, the speaker 134 provides audible output and microphone 136 receives audible input, such as to facilitate a voice conversation. Telecommunications device 102 may include a speakerphone feature to enable telecommunications device 102 to be held away from the user's head during use, thereby facilitating simultaneous viewing of display 114. Audio interface 132 is also in communication with a headphone jack 138 to permit a wired headset including earphones and a microphone to be plugged in to telecommunications device 102 in some implementations to operate in place of built-in speaker 134 and microphone 136.

Telecommunications device 102 also includes, in wireless implementations, a radio transceiver and interface 140 that performs the function of transmitting and receiving radio frequency communications via an antenna 142. The radio interface 140 facilitates wireless connectivity between the telecommunications device 102 and various cell towers, base stations and/or access points. Transmissions to and from the radio interface 140 are conducted under control of the operating system 118. For example, communications received by the radio interface 140 may be disseminated to application programs 122 via the operating system 118, and vice versa.

Telecommunications device 102 also may include a near field interface 144 that performs a function of transmitting and receiving near field radio communications via a near field antenna 167. For example, an accessory token 104 may be communicative with telecommunications device 102 via a Bluetooth® or radio frequency identifier (RFID) interface. Further, near field interface 144 may be used for other functions, as is known in the art, such as communicating directly with nearby devices that are also, for instance, Bluetooth® or RFID enabled. A reader/interrogator 154 may be incorporated into telecommunications device 102.

Telecommunications device 102 also may include a wireless local area network (LAN) interface 148 that performs the function of transmitting and receiving wireless communications using, for example, the IEEE 802.11, 802.16 and/or 802.20 standards. For example, telecommunications device 102 can use WiFi interface 148 to communicate directly with a nearby wireless access point such as for accessing the Internet directly without having to perform the access through the network service provider's network.

Telecommunications device 102 also may include a camera 150 for taking video and still photographs using telecommunications device 102. In some implementations, camera 150 may be used to capture quick response (QR) codes appearing on accessory token 104. In other implementations, a QR code reader 166 may be incorporated into telecommunications device 102 and may capture QR codes appearing on accessory token 104. For example, one or more QR code readers may be incorporated into accessory token device dock(s) 162 and may capture QR codes appearing on the reverse sides of accessory tokens 104.

Telecommunications device 102 also may be outfitted with a global positioning system (GPS) transponder 152 for endowing telecommunications device 102 with various GPS capabilities such as navigation, mapping, or the like. Further, telecommunications device 102 may include a motion sensor 164, such as an accelerometer for determining position, altitude and/or movement of telecommunications device 102, such as for adjusting display orientation, or the like.

One or more additional application programs may be loaded into memory 112 and are run by or in conjunction with operating system (OS) 118. Examples of application programs include conventional application programs, such as game programs, navigation programs, installation wizard programs, email programs, scheduling programs, PIM (personal information management) programs, word processing programs, spreadsheet programs, Internet web browser programs, and so forth.

Among the application programs is token client 122 which is configured to recognize the association of accessory tokens 104 with telecommunications device 102, to initiate communications with data server 106, and to manage a number of operations in the method and system described herein.

Regarding association, accessory tokens 104 may be associated with telecommunications device 102 in a variety of ways. For example, in an implementation, telecommunications device 102 may provide physical ports into which corresponding ports (such as mini USB ports) in accessory tokens 104 may be inserted, thereby resulting in physical connectivity between telecommunications device 102 and accessory token(s) 104. Token client 122 identifies that one or more ports have been populated and identifies accessory token 104 as a compatible accessory token based upon the UDI 190 or other indicia provided by information from accessory token 104. In wireless implementations, token client 122 may identify the receipt of such indicia from accessory token 104 when, for example, accessory token 104 associates with telecommunications device 102 via near field interface 144 (using Bluetooth® or RFID) or acquires a QR code from accessory token 104.

After identifying the association of accessory token 104 with telecommunications device 102, token client 122 may execute any of a variety of functions. In an implementation, token client may immediately initiate communication with data server 106 and convey at least UDI 190 received from accessory token 104 and a unique telecommunications device identifier 123 associated with telecommunications device 102 and other routing information, thereby providing data server 106 with an address and other routing information sufficient to return data associated with UDI 190. Token client 122 may automatically launch other applications on device 102.

In some embodiments, token client 122 may be configured to initiate this data exchange and begin to receive the data associated with UDI 190 without any interaction with the user of telecommunications device 102, other than the user's effort to initially associate accessory token 104 with telecommunications device 102. Thus, a user of telecommunications device 102 can initiate, for example, the download of a music file from data server 106 simply by, for example, attaching an accessory token 104n in the form of a decorative fob to a receptacle incorporated into the shell of telecommunications device 102. In another implementation, token client 122 may be configured to prompt the user of telecommunications device 102, via an audible alarm and/or presenting a user interface on display 114, to indicate his or her authorization to initiate accessing the data (e.g., downloading). Token client 122 may additionally prompt the user of telecommunications device 102 to indicate agreement to licensing terms that may be associated with the data. Token client 122 may present a user interface to the user of telecommunications device 102 requiring the user to input a password in order to receive UDI 190 from accessory token 104.

Telecommunications device 102 is enclosed by a hard or soft shell 156 which may be configured with one or more token device dock(s) 162 (or receptacles) to receive one or more accessory tokens 104. In some implementations, a dock 162 may be complemented with a physical port 120 into which an accessory token (for example, accessory token 104a) may be inserted and securely held by telecommunications device 102, a physical feature such as a loop feature permitting accessory token (for example, accessory token 104n) to be clipped or attached thereto, or a physical surface to which accessory token (for example, accessory token 104b) may be adhered via an adhesive applied to one side of the accessory token. As disclosed above, dock 162 may additionally be configured to detect the presence or association of accessory token 104, thereby informing token client 122 of such association. Such detection may involve population of a port, detecting capacitance, or detecting a unique "snap" tremor caused by snapping the accessory token 104 into dock 162 via an accelerometer or motion detector 164. Token client 122 may be configured to treat such physical association of accessory token 104 with dock 162 as a prerequisite to initiating communication with data server 106, thereby providing a security feature useful in near field implementations, in which users might otherwise associate their telecommunications devices 102 with accessory tokens 104 by simply bringing them near an in-store display of accessory tokens, and receive associated UDI 190 without payment.

While various components, features, and functions of a telecommunications device 102 have been described in the implementation illustrated in FIG. 1B, it should be understood that numerous other configurations, components, features, and the like may be incorporated into telecommunications devices described herein, and that the implementations herein are not limited to any particular configuration for telecommunications devices.

Figure 1C:
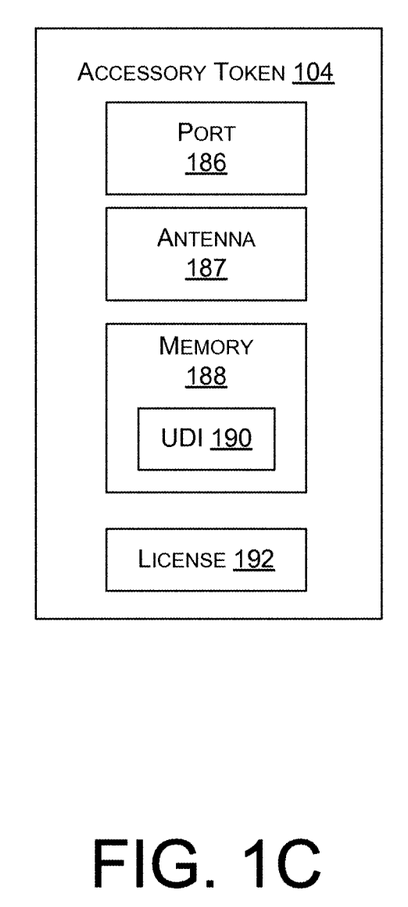
FIG. 1C is a block diagram showing components of an accessory token that may be used to implement the method and system described herein.

FIG. 1C shows accessory token(s) 104 that are any type of physical item that may be received by or communicatively associated with telecommunications device 102. In an embodiment, accessory token 104a may be configured with a male USB connector, which may be plugged into a corresponding female USB connector in telecommunications device 102, thereby providing not only a physical interface between accessory token 104a and telecommunications device 102, but also physical means of securing accessory token 104a to, for instance, the exterior shell of telecommunications device 102. In an embodiment, accessory token 104a may be configured to be received into the exterior shell of telecommunications device 102 via dock 162 which may be, for example, a slot, a clamping method, attachment as a dongle, etc. It will be appreciated that accessory token 104 may take a wide variety of physical forms, including that of a decorative item that can be attached to telecommunications device 102. For example, accessory token 104a may take the form of a decorative tile that can be fitted into a corresponding dock 162 in shell 160 of telecommunications device 102, thereby permitting the user of telecommunications device 102 to customize her device with decoration, in addition to receiving the data 169 and/or access to data upload capabilities disclosed herein. For example, accessory token 104 may itself be a replacement shell, such as a replaceable back cover to telecommunications device 102. It will be appreciated that accessory token 104a may physically or wirelessly interface with telecommunications device 102. In another implementation, accessory token 104n is shown as a decorative dongle or fob that may be clipped or tied to a dock 162 (such as a loop) in shell 160. For another example, accessory token 104b provides the medium for physical attachment to telecommunications device 102. For example, accessory token 104b may take the form of a decorative sticker which, when acquired by the user of telecommunications device 102, may be permanently or temporarily adhered to the exterior shell of telecommunications device 102. In another implementation (not shown), accessory token 104 may be magnetically attached to telecommunications device 102.

Accessory token 104 is configured to provide data for extraction by telecommunications device 102. In some embodiments, accessory token 104 may include a port 186 and/or an antenna 187. For example, accessory token 104 may be configured for physical connectivity via the port 186, such as via a USB connection, to communicate with telecommunications device 102. In another embodiment, accessory token 104 may be configured with wireless near field telecommunications capability sufficient to permit communication between telecommunications device 102 and accessory token 104 when equipped with antenna 187.

Radio Frequency Identification technology or RFID is one type of near field wireless technology that would permit communication between telecommunications device 102 and accessory token 104. RFID is an automatic identification technology whereby digital data encoded in an RFID tag or "smart label" is captured by a reader using radio waves. RFID is similar to bar code technology but uses radio waves to capture data from tags. RFID tags are either "passive" (no battery) or "active" (self-powered by a battery). In passive systems, an RFID reader transmits an energy field that "wakes up" the tag and provides the power for the tag to respond to the reader/interrogator. In active systems, a battery in the tag is used to boost the effective operating range of the tag and to support additional features over passive tags, such as temperature sensing. Tags also can be read-only (stored data can be read but not changed), read/write (stored data can be altered or rewritten), or a combination, in which some data is permanently stored while other memory is left accessible for later encoding and updates. Thus, the accessory token 104 may consist of an RFID tag consisting of an integrated circuit (IC) attached to an antenna, and enclosed in protective packaging. The accessory token 104 can be adhered to the surface of telecommunications device 102 (such as, for example, as a decorative sticker), clasped to telecommunications device as a dongle or fob, or otherwise physically attached to telecommunications device 102.

A QR Code may be used to extract information from accessory token 104. A QR Code is a matrix or two-dimensional bar code. QR Codes storing addresses and URLs may appear in magazines, on signs, buses, business cards or just about any object that users might need information about. For example, mobile phones can read QR codes with their cameras. Users with a telecommunications device 102 equipped with reader software can scan the image of the QR Code, for example with camera 150 or with an embedded reader device (not shown), causing the telecommunications device 102 to launch token client 122.

Accessory token 104 may include memory 188 to retain UDI 190 corresponding to data slots 168 and/or data 169 retained in memory of server 106. The memory 188 may be static or dynamic memory. Static memory may include the QR code (or other single/multidimensional optical codes), RFID data, and so forth. Thus, memory 188 is not limited flash or other solid state types of computer memory. The UDI 190 may be associated with data storage that includes a wide variety of data, including downloadable applications, music files, video files, multimedia applications, icons, widgets, games, ringtones, wallpapers, content streams, sweepstakes information, contest information, lottery information, coupons, calendar information, contact information, maps, photos and other information. In some embodiments, UDI 190 may also be associated with data slot 168 that enables the telecommunications device 102 to upload data when telecommunications device includes a corresponding accessory token 104, which is thereby associated with UDI 190. In these embodiments, the user of telecommunications device 102 may detach or disassociate accessory token 104 and provide it to another user, who could then redeem the uploaded data by associating his telecommunications device 102 with accessory token 104, and thus gain access to data uploaded by the first user. Thus, accessory token 104, in addition to an accessory used to adorn telecommunications device 102, provides a UDI 190 that, when associated with telecommunications device 102 and communicated to data server 106, acts as a token or claim ticket entitling telecommunications device 104 to redeem (i.e., receive via download, content stream, etc.) the associated data from a respective storage address. Accessory token 104 can thus be marketed to consumers as a decorative accessory that additionally provides downloadable or streamable content, applications, etc., as described herein. Accessory token 104 can also be marketed to consumers as an accessory enabling easy data transfer, by providing access to a remote data reserve or store, which the user can then fill by uploading data to data server 106, thereby associating the data with the UDI 190.

In some embodiments, data server 106 provides access to data slot 168 and data 169 in the data slot when accessory token 104 is in communication with telecommunications device 102, and the data server prevents access to the data slot and data upon disengagement of the accessory token. The telecommunications may randomly or periodically resend UDI 190 to the server to maintain access to the data slot while the accessory token 104 is in communication with the telecommunications device 102. In various embodiments, data server 106 may allow access to data slot 168 for a predetermined duration of time after receiving and verifying UDI 190. Upon expiration of the time, telecommunications device 102 may be prevented from accessing data slot 168 and/or data 169 until the UDI is again transmitted to data server 106 and any other restrictions are satisfied (e.g., less than threshold number of accesses of data, etc.).

In some embodiments, accessory token 104 may include a license 192. The license can restrict the data 169 to be used by a single user. License 192 may also be stored, either separately or concurrently, on telecommunications device 102 and/or the data server 106.

Returning to FIG. 1A, data server 106 is communicative with telecommunications device 102 via a networking fabric 108. The networking fabric 108 represents any one or more networks known in the art, such as cellular networks and/or data networks, including wide area networks (WANs), local area networks (LANs), personal area networks (PANs), and/or the Internet. For example, telecommunications device 102 could be connected to both cellular and data networks and the data server could be connected exclusively to data networks. A connection between telecommunications device 102 and the data server 106 may be through a number or routers, base stations, and/or devices acting as bridges between cellular and data networks. Communications between the data server 106 and telecommunications device 102 utilize any sort of communication protocol known in the art for sending and receiving messages, such as the Transmission Control Protocol/Internet Protocol (TCP/IP) and/or the Hypertext Transfer Protocol (HTTP). The networking fabric 108 may be a single carrier's telecommunications network. For example, a cellular telecommunications provider or a converged network telecommunications provider (such as Unlicensed Mobile Access or UMA provider) may provide a single network connecting telecommunications device 102 with data server 106. The networking fabric 108 may also consist of multiple carrier networks.

Figure 1D:
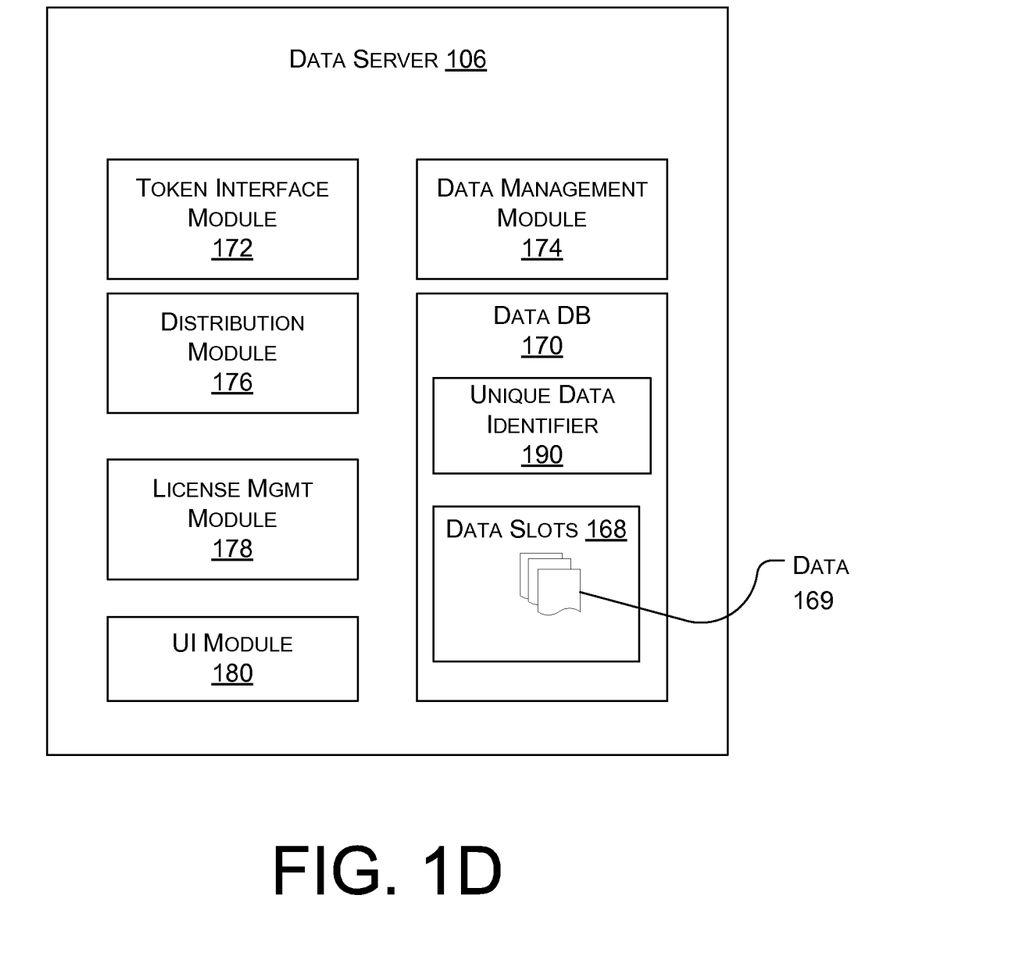
FIG. 1D is a block diagram showing components of a server that may be used to implement the content server described herein.

As shown in FIG. 1D, the data server 106 includes a number of components and modules. In one implementation, the data server 106 includes data or a data slot 168 in a database 170, a token interface module 172, data management module 174, a distribution module 176, and, in some implementations, a license management module 178, and a user interface (UI) module 180.

In various implementations, the data server 106 may be any sort of computing device known in the art equipped with modules and components 168-180. The data server 106 may be a personal computer (PC), a laptop computer, a workstation, a server system, a mainframe, a telecommunications device, a personal digital assistant (PDA), a set-top box, or any other computing device. In some embodiments, the data server 106 represents a plurality of computing devices each implementing some portion of the functionality represented by modules and components 168-180. For example, data server 106 could include a database server storing the data 169 in database 170 and a web server storing the UI module 172 and acquisition module 174, as well as other devices. In some implementations, data server 106 may be a virtual machine implemented on one or more computing devices.

In various implementations, the data 169 is associated with license 192 (shown in FIG. 1C). The license can restrict the data 169 to be used by a single user. In an implementation, the license is applied to the data 169 through digital rights management (DRM) technologies, such as those known in the art. DRM technology might require, for example, a recipient of a pushed installation to assent to a license agreement before the recipient is allowed to utilize the data 169. The license for the data 169 is managed by a license management module 178 of the data server 106, which is described below in further detail.

In various implementations, the data 169 is stored in a database 170. The database 170 can be stored on the server 106 or on another device communicatively coupled to the data server 106 (not shown). The database 170 can be any sort of database known in the art, such as a relational database, a structured database, an unstructured database, or an unstructured file. In addition to storing the data 169, the database 170 also stores information about the data 169 such as, for example, a type classification of the data 169 (e.g., "movie", "song", "application", "book", etc.), a title of the data 169, an artist associated with the data 169, and/or a duration associated with the data 169. In some implementations, data 169 refers to a data slot into which data may be uploaded and associated with a UDI 190, such as in anticipation of sharing the accessory token 104 with a friend or family member, thereby permitting sharing of the data 169.

Token client 122 communicates with token interface module 172 of data server 106. Token client 122 receives at least the UDI 190 that telecommunications device 102 has received from accessory token 104, along with additional address and routing information (e.g., the device identifier 123) sufficient to enable data server 106, via its distribution module 176, to provide data 169 associated with UDI 190 to telecommunications device 102. Token interface module 172 therefore receives the initial communications from telecommunications device 102, provides the UDI 190 to at least data management module 174 and database 170.

Data management module 174 manages the receipt and processing of UDI 190. In an implementation, data management module 174 searches database 170 and validates the existence of data slot 168 that corresponds to the received UDI 190, and additionally validates the existence of data 169 that is associated with UDI 190. If the data management module 174 is unable to either validate the existence of data slot 168 or an association with data 169, then data management module 174 returns such information to client interface module 172 which may generate an appropriate error message to telecommunications device 102. If the data management module 174 both validates the existence of data slot 168 and its correlation to data 169, then data management module 174 notifies distribution module 176 and provides additional information. Data management module 174 may also update records with transactional and other information, such as information reflecting that UDI 190 has been tendered for data redemption, the number of times UDI 190 has been tendered for data redemption, the received additional information from telecommunications device 102, etc. Data management module 174 may also update records to reflect that telecommunications device 102 has agreed to licensing terms, etc.

Distribution module 176 provides the data 169 to telecommunication device 104. Such provision may occur automatically or may require additional operations (such as confirmation from a user, agreeing to a license agreement, etc.) and includes downloading of the data 169 to telecommunications device 102. Prior to provision of the data 169, the distribution module 176 may determine whether the telecommunications device 102 has been configured to receive the data 169. If not, the distribution module 176 may install a client on the telecommunications device 102 or may provide other executable instructions having a similar function(s) and purpose to that of the client.

In some implementations, a license management module 178 tracks the rights acquired in the data 169. The license management module 178 receives this information from database 170 or distribution module 176 in response to data server 106 receiving a data request from telecommunications device 102. In response, the license management module 178 may invoke a user interface (UI) module 172 to present, via the telecommunications device 102, a license agreement that must be assented to before data 169 is provided to telecommunications device 102. Upon receiving an indication of user assent, the license management module 178 informs the distribution module 176, allowing the transaction to proceed. The license management module 178 may inform the licensors or an agent of the licensors of the purchase of the data through, for example, emails, reports, or invoices.

FIGS. 2A, 2B, 2C, 3 and 4 show flow charts that enable a user of telecommunications device 102 to access data slots 168 and/or data 169 stored on data server 106 by using UDI 190 obtained from accessory token 104.

Figure 2A:
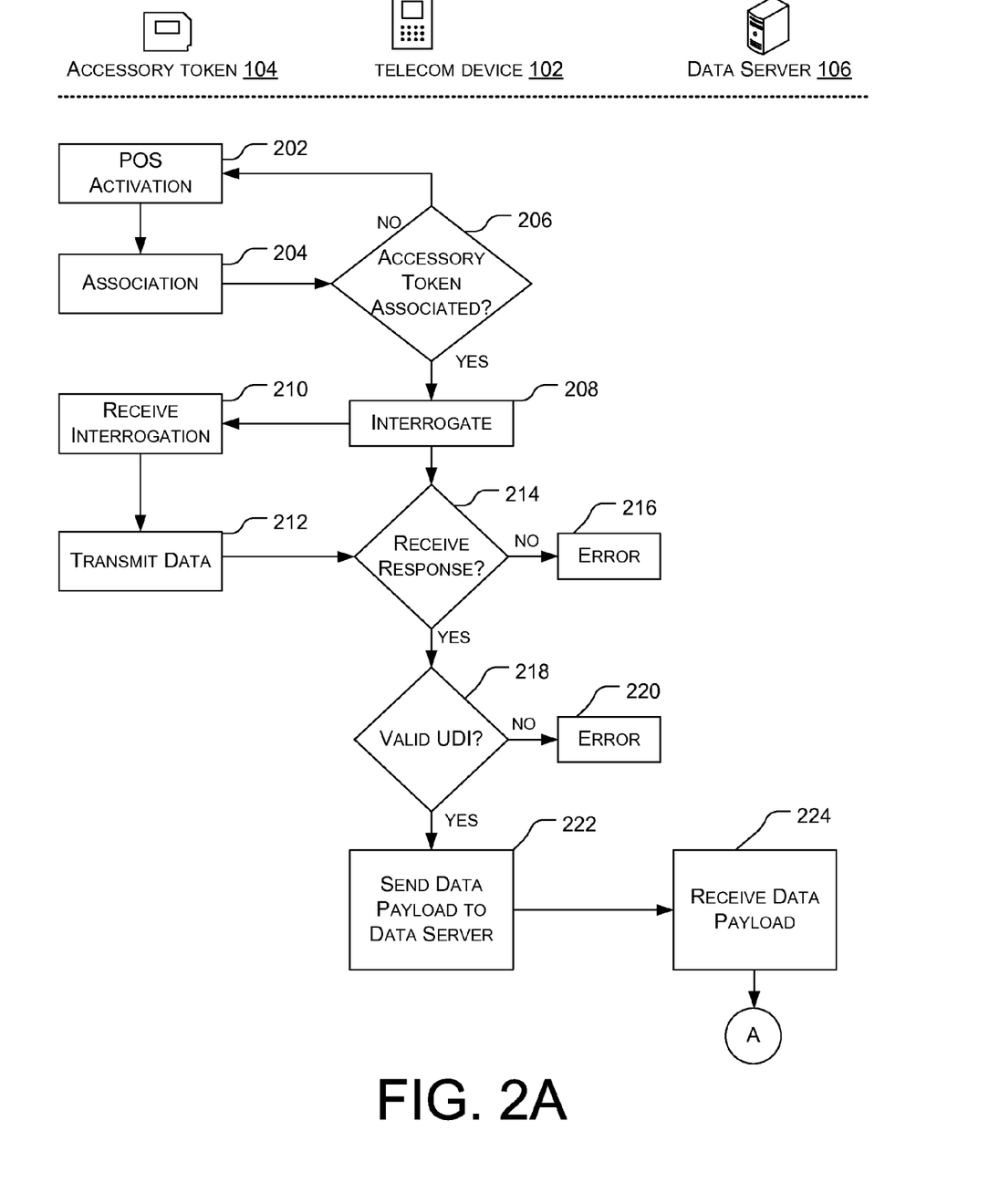
FIGS. 2A, 2B and 2C present a flowchart showing a method of enabling a user of a telecommunications device to access data in accordance with various embodiments.

At 202, a user of telecommunications device 102 acquires accessory token 104. Acquisition may occur at a location in which a vendor, promoter, or other person/entity may offer accessory token(s) 104 for sale or free of charge, but may also occur when exchanged between telecommunications device users. In retail instances, accessory token 104 and its associated UDI 190 and other information may be provided to users of telecommunications devices preassociated with applications, audio files, video files and any other data that may be acquired and downloaded to telecommunications device 102. Thus, a vendor may market accessory tokens 104 not just as interesting or decorative accessory items, but also for their associated content, applications, etc. For example, accessory token 104 may feature a decorative image of the artist who performs a musical track that can be acquired following association of accessory token 104 with telecommunications device 102 as described herein. In other implementations, accessory token 104 may be provided free of charge, thereby allowing a user of telecommunications device 102 to receive free applications, content, etc. Such implementations may be particularly useful in sweepstakes, gaming and other offerings. Alternatively, such free accessory token 104 may be associated with a specific "available" or "free" data slot 168 at server 106 to which the user of telecommunications device 102 may upload data 169 and associate the data with UDI 190, thereby permitting the user to transfer the accessory token 104 to a third party in order for that party to access the uploaded data as described herein. In this implementation, accessory token 104 becomes a tradable token by which users of telecommunications devices can exchange data.

In implementations in which data is already associated with the UDI 190 associated with accessory token 104, a vendor of such tokens may wish to implement an activation procedure in order to ensure that data associated with the UDI 190 is not misappropriated by third parties. For example, if accessory token 104 is RFID enabled, a user of an RFID-enabled telecommunications device 102 might, absent such security measures, associate the telecommunications device with the accessory token 104 simply by holding his or her telecommunications device 102 near the retail package containing accessory token 104, thereby triggering association of telecommunication device 102 and accessory token 104, and obtaining UDI 190 without paying for the accessory token 104 containing such information. A seller may choose, at 202, to implement a point of sale activation process. Such activation processes are well known in the art, and may include running an RFID-enabled accessory token 104 through an RFID-enabled activation device at the point of sale in conjunction with completing a sales transaction for the accessory token, which updates a security field 192 in the accessory token 104 (and/or data server 106), thereby permitting the accessory token 104 to provide UDI 190 when interrogated by telecommunications device 102 (or the data server 106 to provide access to the data 169).

At 204, the user of telecommunications device 102 associates accessory token 104 with telecommunications devices 102, and, at 206, telecommunications device 102 detects whether it has become associated with an accessory token 104. Association of accessory token 104 may be detected in a variety of ways. For example, in implementations in which telecommunications device 102 incorporates physical ports (such as USB ports) into which corresponding ports incorporated into accessory token 104 can be mated, telecommunications device detects a data flow from accessory token 104. In another implementation, telecommunications device 102 may detect capacitance created by the mating of the physical ports described herein. In another implementation, an accessory token dock may be incorporated into the shell of telecommunications device 102 which includes detection mechanisms that trigger awareness in telecommunication device 102 that an accessory token 104 is available for association. In wireless implementations, telecommunications device 102 may periodically scan and seek the availability of accessory token 104. In an implementation, telecommunications device 102 may have Bluetooth capability and may identify the availability of accessory token 104 while scanning for other Bluetooth enabled devices. In another implementation, telecommunications device 104 may be RFID-enabled and may become aware of an RFID-enabled accessory token 104 when such token is brought into close proximity of telecommunications device 102. In wireless implementations, additional security may be implemented to ensure that a user of telecommunication device 102 does not improperly acquire a unique data identifier and other data from accessory token 104 by requiring accessory token 104 to be physically docked with telecommunications device 102. For example, telecommunications device 102 may detect the presence and availability of an RFID enabled accessory token 104, but in order to process a received unique data identifier, may additionally require that accessory token be docked with telecommunications device in a dock 162. In an implementation, accessory token 104 may be packaged with a password in security data 192 that a user must enter into telecommunications device 102 before accessory token 104 may share the UDI 190 with telecommunications device 102. When the accessory token is not associated, the process may repeat the activation at 202 and association at 204.

Detection of accessory token 104 launches token client 122 which, at 208, interrogates accessory token 104. Accessory token 104 receives the interrogation at 210 and, if the interrogation query is compatible, transmits its data payload at 212. The data payload will include at least UDI 190, but may include additional information, such as the address of server 106 and security data 192 (such as a password). In other implementations, address information for server 106 may reside in token client 122 or elsewhere in telecommunications device 102, and need not be provided by accessory token 104.

At 214, telecommunications device 102 either receives or does not receive a data payload from accessory token 104. If no response is received within an appropriate time period, or if the received response is unintelligible, then telecommunications device 102 may present error message 216 on its display, informing the user of the error. If a response is received and is intelligible, then token client 122 validates the received data at 218. Validation may include validating a user input of a password, validating that the received data is in an intelligible format, validating authenticity data, etc. If valid, then token client 122 will prepare and send, at 222, a data payload for transmission to data server 106, consisting of at least UDI 190 and may also include security data 192 and/or telecommunications device 102 identifiers and routing information to ensure that data server 106 can identify and return data to telecommunications device 102. Such identifiers may include a phone number, an e-mail address, an SMS address, an International Mobile Subscriber Identifier (IMSI), or any other information or combinations of information necessary for server 106 to return data 169 to telecommunications device 102. At 224, data server 106 receives data payload.

Figure 2B:
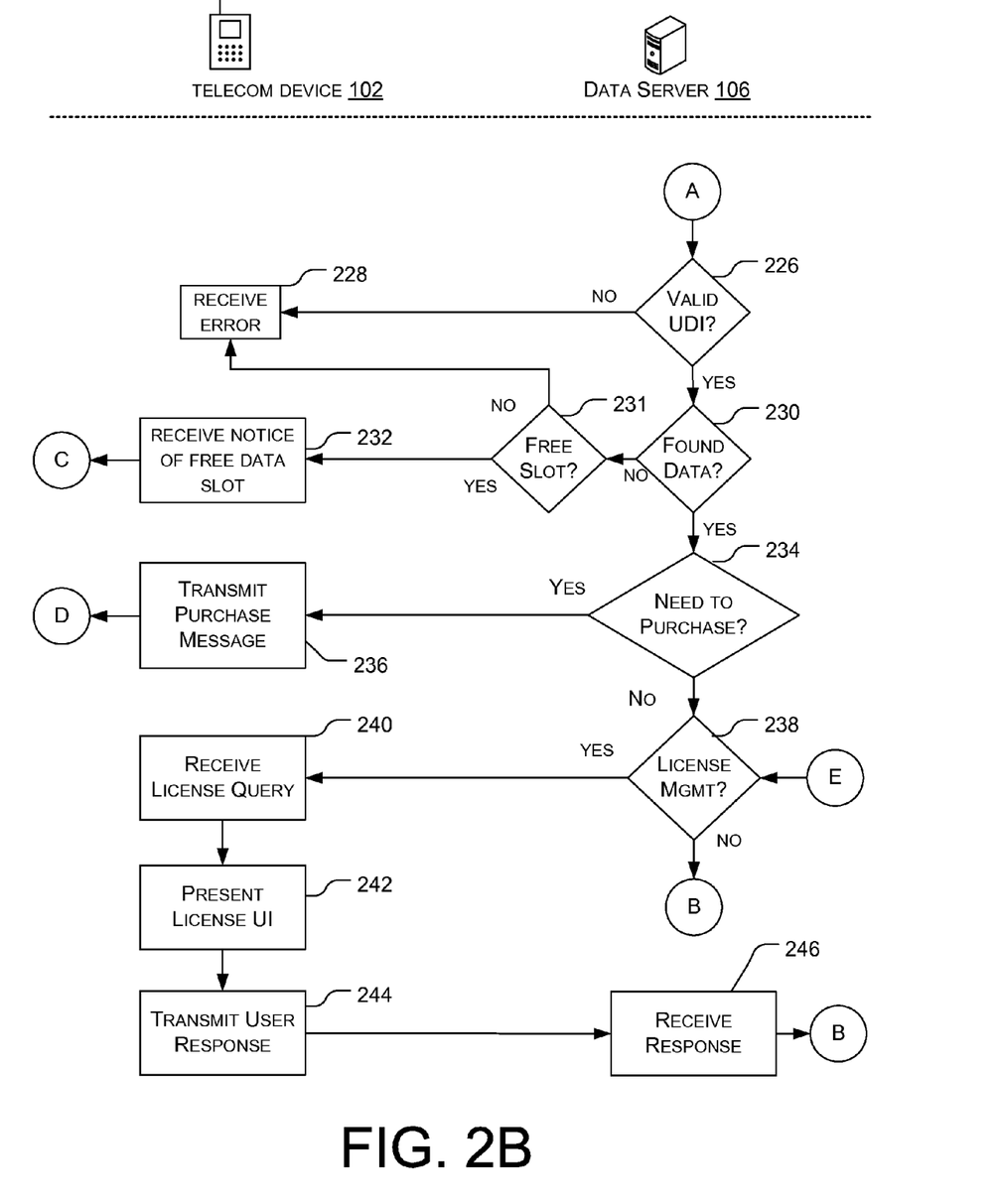

Proceeding to FIG. 2B, at 226, data server 106 initiates a validation sequence. During validation, server 106 will poll its database 168 to determine whether the received UDI 190 is a valid UDI. For example, a received UDI that is not in a format known to server 106 will be rejected. If server 106 is unable to validate the received UDI, it may return an error message to telecommunications device 102 at 228.

If server 106 validates the received UDI, then it determines, at 230, whether it holds data 169 corresponding to the received UDI. When no data is detected at 230, the server 106 determines if there is a free data slot 168 corresponding to the received UDI 190. Server 106 may determine that there is no data associated with the received UDI 190 in various implementations at 230. For example, in implementations in which an accessory token 104 is marketed and sold in a "one use only" redemption format (such as providing one time only download of audio content), server 106 may have already received redemption and validated UDI 190, and disbursed such data 169. In another implementation, accessory tokens 104 may be marketed and sold for unlimited redemptions, in which case server 106 may have already received and validated the UDI, and provided the associated data. In such implementations, server 106 may dispatch a notice to telecommunications device 102 alerting it that the data has already been redeemed. In another implementation, initial redemption of the received UDI 190 may free up a data slot associated with the received UDI, thereby permitting the user of telecommunications device 102 to upload data and associate such data with the UDI 190. In another implementation, accessory token 104 may be provided to users of telecommunications devices 102 with no preassociated data and, in such cases, server 106 will identify that the received UDI is associated with a vacant data slot. In such cases, server 106 will provide a notice to telecommunications device 102 alerting the user of such device to the availability of the data slot.

Figure 3:
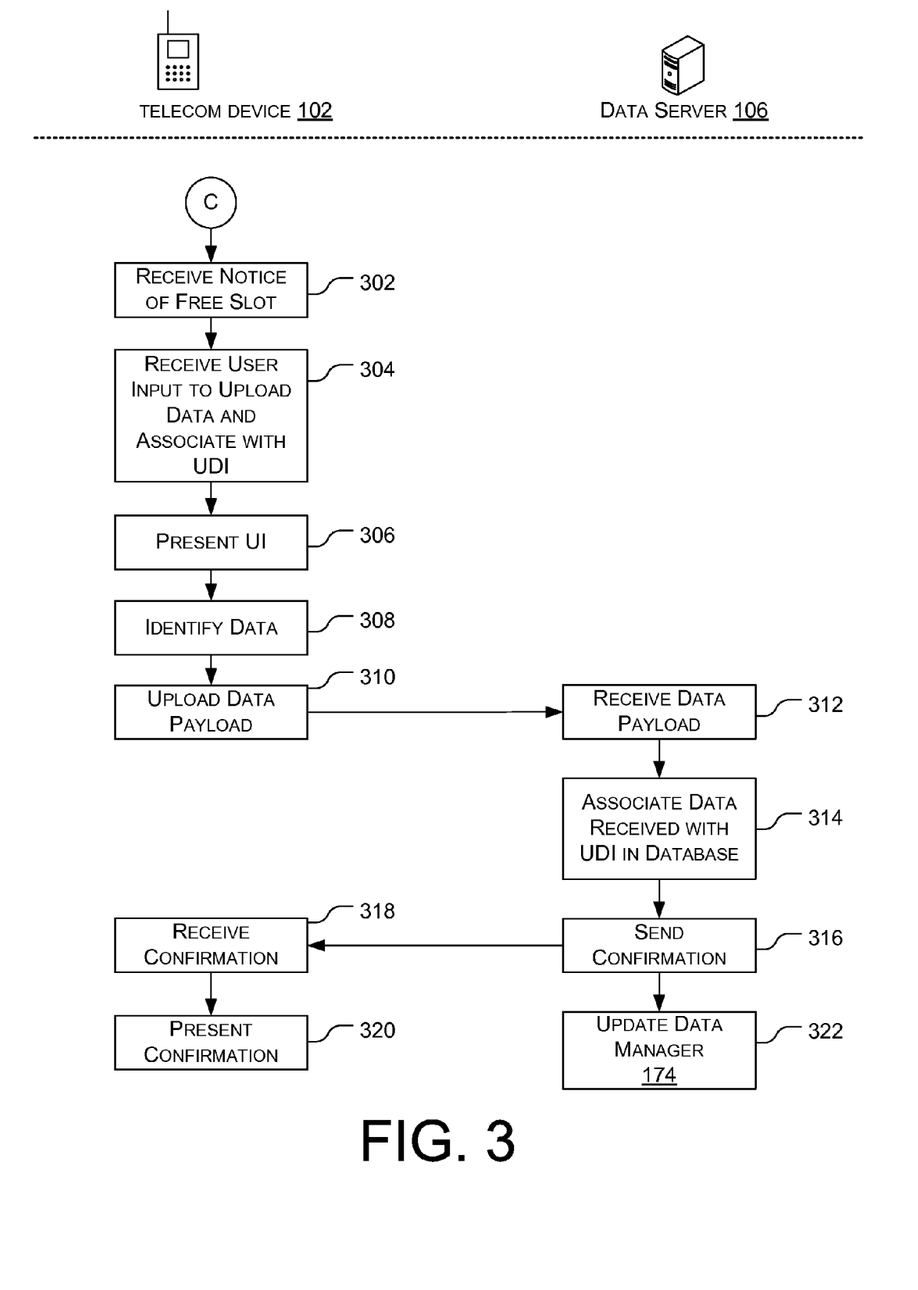
FIG. 3 is a flowchart showing additional or alternate operations for a user of a telecommunications device to upload data to a server and associate such data with a unique data identifier of an accessory token, in accordance with various embodiments.

Referring to FIG. 3, telecommunications device 102 receives the notice of the vacant or free data slot at 302 (i.e., additional write memory is available for data upload from user), and presents such notice to the user of telecommunications device 102. At 304, telecommunications device 102 receives an indication from the user of such device that he or she wishes to upload or fill data to the vacant data slot and to associate such data with UDI 190. At 306, telecommunications device 102 presents a user interface to the user of such device, enabling the user of telecommunications device 102 to designate data for uploading. At 308, telecommunications device 102 identifies the data that has been designated for uploading, or otherwise receives such data (for instance, from another device via a USB interface), and, at 310, begins upload of such data to data server 106.

At 312, server 106 receives the uploaded data from telecommunications device 102 and, at 314, associates such data with the UDI 190. At 316, server 106 may provide a confirmation receipt to telecommunications device 102, alerting the user of telecommunications device 102 to the successful upload of the data and association with the UDI 190. At 318, telecommunications device 102 receives the confirmation from server 106 and, at 320, presents the confirmation to the user of the device (such as by a notice appearing on the display of telecommunications device 102). At this point, the user of telecommunications device 102 may detach or disassociate accessory token 104 from telecommunications device 102, and provide accessory token 104 to another user, who may then access the uploaded data as provided herein. At 322, server 106 updates data manager 174 with information sufficient to reflect association of uploaded data with UDI 190.

Returning to FIG. 2B, if, at 230, server 106 identifies data associated with the received UDI 190. At 234, the sever 106 may determine whether the data needs to be purchased. For instance, in implementations in which an accessory token 104 is marketed in conjunction with sale of musical content, such content may be accessed one time only. In those instances, server 106 will poll its database(s) to determine whether the UDI 190 is being presented for the first time or whether the data needs to be purchased. In some instances, the data may have to be purchased for each access of the data. When the data is to be purchased at 234 (via the "yes" route), then at 236, telecommunications device 102 receives notice of a purchase requirement. The purchase (or licensing purchase) is discussed next with reference to FIG. 4.

Figure 4:
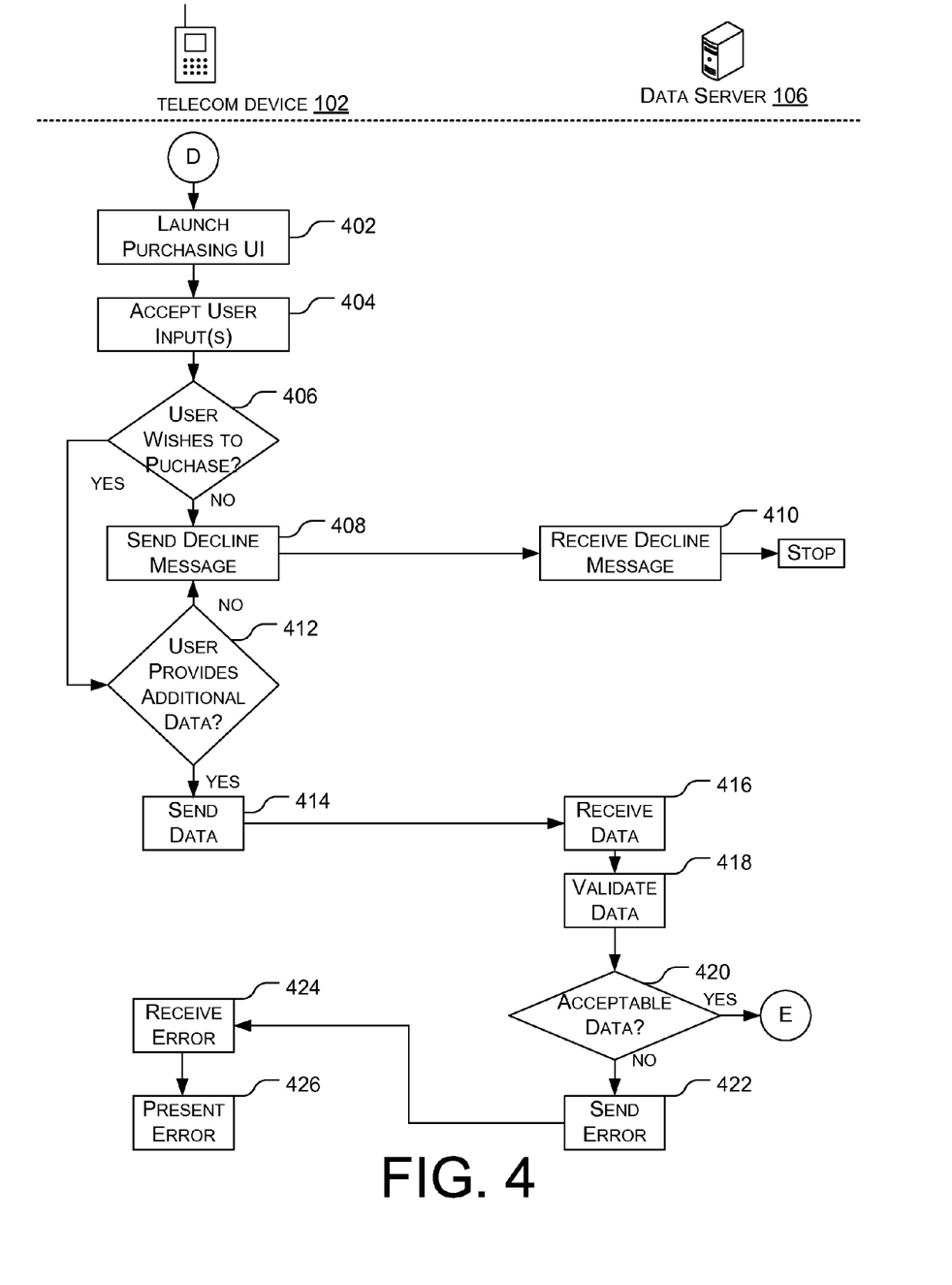
FIG. 4 is a flowchart showing additional or alternate operations for a user of a telecommunications device to acquire data that has been previously acquired in accordance with various embodiments.

Referring to FIG. 4, telecommunications device 102 launches a purchasing (or license purchase) interface at 402. The purchase interface allows a user of telecommunications device 102 to enter information sufficient to purchase the data associated with UDI 190. At 404, telecommunications device 102 accepts user input and, at 406, determines whether the inputted information indicates that the user of telecommunications device 102 wishes to purchase the data. If the received information indicates that the user of telecommunications device 102 does not wish to purchase/license the data, then, at 408, telecommunications device 102 transmits a message to server 106 indicating that the user has declined to purchase/license the content. Server 106 receives such indication at 410 and further processing stops. If the user of telecommunications device 102 indicates that he or she wishes to purchase/license the data, then, at 412, telecommunications device 102 determines whether the user has provided additional information (such as valid credit card and other data) sufficient to purchase/license the data. If the user has not provided sufficient data, then telecommunications device 102 provides a message to server 106 indicating that the user has failed to provide such information, and processing continues to block 410 as previously described. If the user successfully provides the additional information, then, at 414, telecommunications device 102 provides such data to server 106 which, at 416, receives such information and, at 418, validates such data. Validation may involve, for example, confirmation with the user's credit card issuer that the provided credit card and other purchase information are valid and acceptable. At 420, server 106 determines whether the purchase/licensing information is acceptable. If it is not acceptable, then server 106 transmits a decline or error message at 422. In some implementations, server 106 may then terminate processing of the transaction. At 424, telecommunications device 102 receives the decline/error message and, at 426, presents a decline/error message to the user. In some implementations, telecommunications device 102 may present the user with opportunity to reenter the purchase/licensing error, at which point processing returns to block 412 and continues as previously described. If, at 420, server 106 determines that the entered purchase/licensing information is acceptable, then processing returns to block 238 of FIG. 2B.

At 238, server 106 determines whether it must obtain the user's confirmation that he or she will be bound to the terms of a license agreement relating to the data. If server 106 has already received the user's confirmation to be bound to the terms of a license agreement (yes at decision 248), or if such assent to a license agreement is not required vis-à-vis the data, then processing continues to block 252 as described below. If server 106 must receive the user's agreement to the terms of a license agreement, then it transmits a message requiring such licensing confirmation to telecommunications device 102, which is received by telecommunications device 102 at 240. At 242, telecommunications device 102 presents a licensing user interface to the user of the device and, at 244, receives a user input and determines whether the input affirms or declines agreement to the license agreement. The response is then forwarded to server 106 at 246 and continued process occurs at FIG. 2C as discussed next.

Figure 2C:
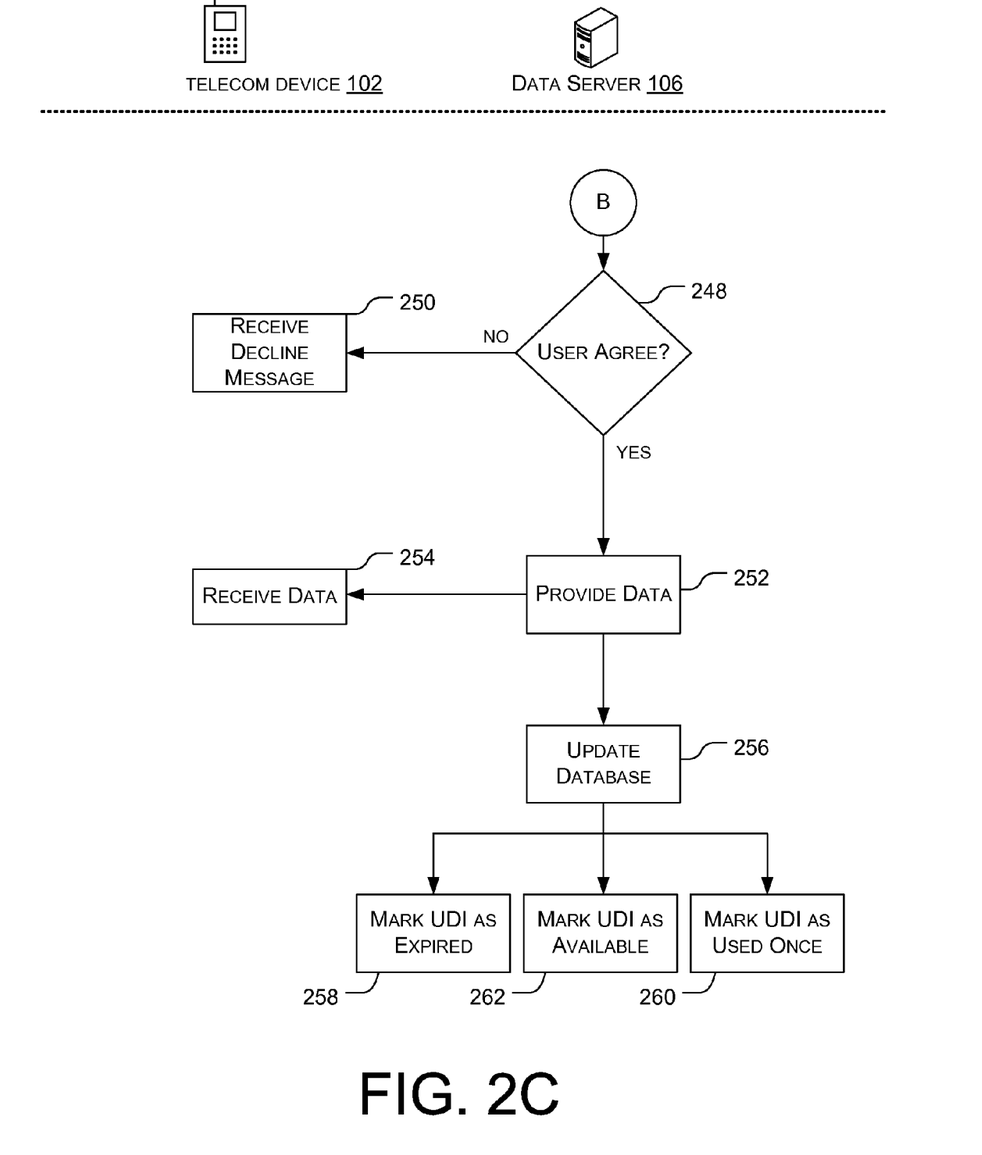

Proceeding to FIG. 2C, at 248, server 106 determines whether the user has agreed to the terms of the license agreement. If the user has not agreed to the terms, then server 106 generates a decline message and transmits it to the telecommunications device 102, which is received by the telecommunications device 102 at 250. In an implementation, telecommunications device 102 may then display a decline message to the user, may provide an opportunity to reenter an indication of the user's agreement to the terms of the license agreement, or may simply stop further processing.

If server 106 determines that the user has agreed to the terms of the license agreement, then server 106 will initiate transfer or downloading of the data associated with UDI 190 to telecommunications device 102. At 254, telecommunications device 102 receives the data from server 106. Download of the data 169 may be confirmed via one or more confirmatory messages between telecommunications device 102 and server 106. When the download of the data is successfully completed, server 106 then updates its data manager 174 at 256. In implementations in which accessory tokens 104 are one use only tokens (i.e., may be redeemed once for data associated with the UDI), server 106 will update is database(s) to indicate that the UDI has been successfully redeemed and is expired or otherwise may not be reused at 258. In implementations in which accessory tokens 104 may be used to redeem specific data repeatedly (for instance, redemption of an audio file), server 106 may update its database(s) to indicate that UDI has been tendered once at 260 and the associated data redeemed, and that future tenders of the UDI require additional processing through a purchase path such as described with respect to FIG. 4. In implementations in which accessory tokens 104 may be initially redeemed for data associated with the UDI 190, and thereafter may be used to upload and associate user-provided data with UDI 190, and to download the uploaded content, server 106 will update its database(s) at 262 to reflect that the data slot associated with the UDI is available to receive an upload and association of the uploaded data with the UDI.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having operations, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

What is claimed is:

1. A system comprising:
a server to associate secure data storage with a unique data identifier (UDI), the server to provide access to the secure data storage by a remote device in response to receipt of a request and while the remote device is physically coupled to a physical accessory token that contains the UDI;
a telecommunications device to act as the remote device to exchange data with the server, the telecommunications device configured to:
determine that the physical accessory token is physically coupled to the telecommunications device,
extract the UDI from the physical accessory token,
determine an association of the UDI to the secure data storage and the server;
transmit the UDI to the server, and
access data from the secure data storage in response to the UDI being determined to be valid by the server and the physical accessory token being determined to be physically coupled to the telecommunications device; and
the physical accessory token configured to physically couple to the telecommunications device and to communicate with the telecommunications device when the physical accessory token is physically coupled to the telecommunications device, the accessory token to store the UDI that is associated with secure data storage made accessible by the server, which when extracted by the telecommunications device is transmitted to the server.

2. The system as recited in claim 1, wherein the physical accessory token includes the UDI stored as static data on the physical accessory token, which is extractable by the telecommunications device by a wired or wireless communication.

3. The system as recited in claim 1, wherein the physical accessory token includes the UDI as a graphical design that is readable by an optical reader of the telecommunications device.

4. The system as recited in claim 1, wherein the server provides access to the secure data storage and the data in the secure data storage when the physical accessory token is in communication with the telecommunications device, and the server prevents access to the secure data storage and the data upon receipt, from the telecommunications device, of a notification of disengagement of the physical accessory token.

5. The system as recited in claim 1, wherein the server imposes a restriction of access to data in the secure data storage by having the user perform an acceptance of a license agreement prior to gaining access to the data.

6. The system as recited in claim 1, wherein the secure data storage of the server enables uploading of data from the telecommunications device to the server for secure storage in the secure data storage.

7. One or more non-transitory computer-readable media storing computer-executable instructions that, when executed on one or more processors, perform acts comprising:
   receiving a unique data identifier (UDI) from a physical accessory token that is physically coupled to a telecommunications device and is in communication with the telecommunications device, the UDI associated with secure data storage provided by a server;
   transmitting, via a wireless network, at least the UDI to the server to access the secure data storage that is only accessible while the physical accessory token is in communication with the telecommunications device;
   receiving data stored in the secure data storage from the server while the physical accessory token is coupled to the telecommunications device and is in communication with the telecommunications device;
   detecting decoupling of the physical accessory token from the telecommunications device; and
   transmitting a notification to the server in response to detection that the physical accessory token is disengaged from the telecommunications device, the notification to terminate access to the secure data storage.

8. The one or more computer-readable media as recited in claim 7, wherein the secure data storage includes preloaded data that is accessible by the telecommunications device upon receipt of the UDI, the preloaded data including at least one of a music file or a video file.

9. The one or more computer-readable media as recited in claim 7, wherein the transmitting further includes transmitting a license agreement prior to the receiving the data stored in the secure data storage.

10. The one or more computer-readable media as recited in claim 7, wherein the receiving the UDI initiates the transmitting of the UDI to the server and the receiving the data stored in the secure data storage without receipt of user input by the telecommunications device.

11. The one or more computer-readable media as recited in claim 7, wherein the receiving the data stored in the secure data storage includes receiving streaming data from the server.

12. The one or more computer-readable media as recited in claim 7, further comprising uploading data to the secure data storage using the UDI while the physical accessory token is in communication with the telecommunications device.

13. A method comprising:
   receiving a unique data identifier (UDI) in response to physical coupling of a physical accessory token to a telecommunications device, the physical accessory token being in communication with the telecommunications device in response to the physical coupling, the UDI to provide access to data stored on a server;
   transmitting at least the UDI to a server; and
   receiving the data from the server in response to the physical accessory token being physically coupled to the telecommunications;
   detecting decoupling of the physical accessory token from the telecommunications device; and
   transmitting a notification to the server in response to detection that the physical accessory token is disengaged from the telecommunications device, the notification to terminate access to the data.

14. The method of claim 13, further comprising transmitting at least one of device information or user information to the server with the UDI.

15. The method of claim 13, further comprising receiving a license agreement request from the server prior to receiving the data, wherein a receipt of the data is contingent upon an acceptance of the license agreement request.

16. The method of claim 13, wherein further comprising uploading data to the server to securely store the data on the server in association with the UDI and for later retrieval by a telecommunications device when in communication with the physical accessory token.

17. The method of claim 13, further comprising receiving the physical accessory token by the telecommunications device as at least one of a replaceable shell, a replaceable tile a skin or a fob.

18. The system as recited in claim 4, wherein the telecommunications device:
   detects disengagement of the physical accessory token from the telecommunications device; and
   transmits the notification to the server in response to detection that the physical accessory token is disengaged from the telecommunications device.

19. The system as recited in claim 1, wherein the telecommunications device extracts the UDI form the physical accessory token a plurality of times during the access of the secure data storage to verify that the physical accessory token remains coupled to the telecommunications device during the access.

20. The system as recited in claim 1, wherein the telecommunications device is a first telecommunications device, and wherein the first telecommunications device is further configured to store content on the secure data storage through use of the UDI; and
   further comprising a second telecommunications device configured to:
      determine that the physical accessory token is physically coupled to the second telecommunications device,
      extract the UDI from the physical accessory token,
      determine the association of the UDI to the secure data storage and the server;
      transmit the UDI to the server, and
      access the content from the secure data storage in response to the UDI being determined to be valid by the server and the physical accessory token being determined to be physically coupled to the second telecommunications device.

* * * * *